Patented Oct. 29, 1940

2,219,463

UNITED STATES PATENT OFFICE 2,219,463

STABILIZED VINYL RESINS

Victor Yngve, Lakewood, Ohio, assignor to Carbide and Carbon Chemicals Corporation, a corporation of New York No Drawing. Application December 31, 1936, Serial No. 118,568

14 Claims. (Cl. 260—86)

The invention relates to stabilized vinyl resins and compositions containing the same. It is particularly concerned with new and improved stabilizing materials which show definite advantages in preventing deterioration of vinyl resins at elevated temperatures.

As synthetic resinous bodies vinyl resins are well known in the art, and their valuable properties as components of plastic compositions of various sorts have been recognized. In the compounding and processing of such resins into molded and extruded articles, or as constituents of certain coating compositions it is usually necessary to subject the plastics to certain degrees of heat. Under such conditions, as well as at elevated temperatures which may be encountered in normal usage, a tendency toward deterioration is quite commonly encountered. To prevent decomposition in this respect it has, therefore, been considered essential with known types of vinyl resin to incorporate therewith additive materials adapted to exert a stabilizing action, and numerous compounds have been suggested for this purpose.

The present invention is particularly concerned with vinyl resins of the type which may be formed by conjoint polymerization of a vinyl halide with the vinyl ester of an aliphatic acid, such as are described in U. S. Patent No. 1,935,577 to E. W. Reid. Within the broader class of these resins, conjointly polymerized vinyl chloride and vinyl acetate containing in the polymer 60% to 95% of vinyl chloride, or other halide, are especially susceptible to stabilization by the compounds hereinafter described.

In accordance with my invention I have found that organic compounds of lead and tin, particularly aryl and mixed aryl-alkyl derivatives of these metals will function as excellent stabilizers for vinyl resins, and when intimately dispersed therein will provide plastic compositions of substantially improved resistance to heat deterioration. A particular advantage in these compounds, other than their actual stabilizing function, also resides in the fact that resin compositions incorporating them show practically no tendency toward discoloration in the presence of hydrogen sulfide, thereby presenting an especially valuable application of the materials in vinyl resin plastics which may be contacted with sulfur compounds.

A quite broad class of these aryl and mixed aryl-alkyl organo-metallic lead and tin compounds have shown a very satisfactory stabilizing action. In the mixed aryl-alkyl derivatives, alkyl groups containing in the radical three or more carbon atoms are preferable. Typical of the preferred alkyl radicals are propyl, isopropyl, butyl, isobutyl, tertiary butyl, the various amyl groups and the like. In the aryl and mixed aryl-alkyl derivatives, those having phenyl, tolyl, xylyl, naphthyl groups are typical of suitable compounds. A mixed grouping which may include two or more different aryl or alkyl radicals is also appropriate. Representative of specific compounds within the broader classification are those of the following formulae:

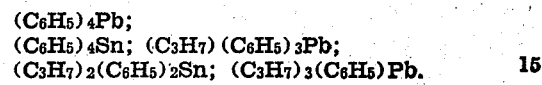

Throughout this specification, and the claims, the broadest scope of the invention as defined by the class "organo-metallic aryl and aryl-alkyl derivatives of lead and tin" is intended to include any or all of the compounds as above represented.

As an example of the effectiveness of these new stabilizers a very small quantity of triphenyl tin hydroxide was incorporated in a vinyl resin plastic composition. The resin employed was one formed by conjoint polymerization of vinyl chloride and vinyl acetate and containing about 87% vinyl chloride in the polymer. The triphenyl tin hydroxide, in quantities about 1.0% by weight of the resin, was intimately and thoroughly dispersed in the resinous mass by milling on a heated two roll mill. In subsequent processing at elevated temperatures the plastic remained clear, and under heat tests at 135° C. the resistance to deterioration as evidenced by discoloring or blackening of the resin was very good.

Further experiments with vinyl resin compositions similar to the above were made, including as the stabilizer, compounds such as diphenyl lead oxide, tetraphenyl lead, propyl triphenyl lead, tripropyl phenyl lead, dipropyl diphenyl lead and corresponding tin derivatives. The results obtained showed improved heat stability in all instances over plastic compositions of similar vinyl resin containing known stabilizing materials.

To incorporate the stabilizer within the resin composition methods heretofore known may be employed which will effect an intimate dispersion thereof throughout the resin mass. The amounts necessary to effect desirable heat stability are also within a range heretofore found suitable with other materials, varying from about 0.5% to about 3.0% by weight of the vinyl resin. In the compounding of plastic compositions for various uses, there may be included any of the common solvents, plasticizers, pigments, and other modifying materials without detrimental effect upon the heat stability afforded by these new stabilizers.

Modifications within the scope of the appended claims will be evident and are intended to be included within the inventions defined therein.

I claim:

1. A heat-stable resinous composition comprising a vinyl resin containing a polymerized vinyl halide, and a stabilizing material intimately dispersed therein, said stabilizing material comprising a member of the group consisting of an organo-metallic aryl derivative of lead and tin.

2. A heat-stable resinous composition comprising a vinyl resin containing a polymerized vinyl halide, and a stabilizing material intimately dispersed therein, said stabilizing material comprising a member of the group consisting of an organo-metallic mixed aryl and alkyl derivative of lead and tin.

3. A heat-stable resinous composition comprising a vinyl resin of the type formed by the conjoint polymerization of a vinyl halide with a vinyl ester of an aliphatic acid and containing in the polymer about 65% to 90% of the vinyl halide, and a stabilizing material intimately dispersed therein, said stabilizing material comprising a member of the group consisting of organo-metallic aryl and mixed aryl-alkyl derivatives of lead and tin.

4. A heat-stable resinous composition comprising a vinyl resin of the type formed by the conjoint polymerization of a vinyl halide with a vinyl ester of an aliphatic acid and containing in the polymer about 65% to 90% of the vinyl halide, and a stabilizing material intimately dispersed therein, said stabilizing material comprising a member of the group consisting of tetra-aryl derivatives of lead and tin.

5. A heat-stable resinous composition comprising a vinyl resin of the type formed by the conjoint polymerization of vinyl chloride with vinyl acetate and containing in the polymer about 65% to 90% of vinyl chloride, and a stabilizing material intimately dispersed therein, said stabilizing material comprising tin tetraphenyl.

6. A heat-stable resinous composition comprising a vinyl resin of the type formed by the conjoint polymerization of vinyl chloride with vinyl acetate and containing in the polymer about 65% to 90% of vinyl chloride, and a stabilizing material intimately dispersed therein, said stabilizing material comprising propyl triphenyl tin.

7. Process for producing heat-stable resinous compositions which comprises intimately mixing a vinyl resin containing a polymerized vinyl halide with a stabilizing material comprising a member of the group consisting of organo-metallic aryl and mixed aryl-alkyl derivatives of lead and tin.

8. Process of producing heat-stable resinous compositions which comprises intimately mixing a vinyl resin of the type formed by conjoint polymerization of vinyl chloride with vinyl acetate and containing about 60% to 95% vinyl chloride in the polymer with a stabilizing material, said material comprising a member of the group consisting of tetra aryl derivatives of lead and tin.

9. A heat-stable resinous composition comprising a vinyl resin containing polymerized vinyl halide, and a stabilizing material, said stabilizing material comprising a member of the group consisting of organo-metallic aryl and mixed aryl-alkyl derivatives of lead and tin.

10. A heat-stable resinous composition comprising a vinyl resin containing polymerized vinyl halide, and a stabilizing material, said stabilizing material comprising a member of the group consisting of organo-metallic aryl and mixed aryl-alkyl derivatives of tin.

11. A heat-stable resinous composition comprising a vinyl resin containing polymerized vinyl halide, and a stabilizing material, said stabilizing material comprising an organo-metallic aryl derivative of tin.

12. A heat-stable resinous composition comprising a vinyl resin containing polymerized vinyl halide, and a stabilizing material, said stabilizing material comprising an organo-metallic tetra-aryl derivative of tin.

13. A heat-stable resinous composition comprising a vinyl resin containing polymerized vinyl halide, and a stabilizing material, said stabilizing material comprising an organo-metallic mixed aryl-alkyl derivative of tin.

14. Process for producing heat-stable resinous compositions which comprises intimately mixing a vinyl resin containing polymerized vinyl halide with a stabilizing material comprising a member of the group consisting of organo-metallic aryl and mixed aryl-alkyl derivatives of tin.

VICTOR YNGVE.